United States Patent [19]

Fujiwara et al.

[11] Patent Number: 4,545,213
[45] Date of Patent: Oct. 8, 1985

[54] REFRIGERATOR FOR VEHICLE
[75] Inventors: Kenichi Fujiwara, Kariya, Japan; Hikaru Sugi, Victoria, Australia; Eiichi Hasada, Okazaki, Japan
[73] Assignee: Nippondenso Co., Ltd., Kariya, Japan
[21] Appl. No.: 628,567
[22] Filed: Jul. 6, 1984
[30] Foreign Application Priority Data Feb. 27, 1984 [JP] Japan .................................. 59-36698

[51] Int. Cl.⁴ ...................... G05D 23/32; F25D 17/02
[52] U.S. Cl. .................................... 6 R/158; 62/201; 62/440
[58] Field of Search ............... 62/201, 98, 440, 430, 62/199, 158

[56] References Cited

U.S. PATENT DOCUMENTS

| | | | |
|---|---|---|---|
| 1,957,313 | 5/1934 | Bichowsky et al. | 62/201 |
| 2,222,543 | 11/1940 | Schmidt | 62/441 X |
| 2,290,190 | 7/1942 | Jacobs | 62/440 X |
| 2,323,354 | 7/1943 | Rees | 62/201 X |
| 3,848,429 | 11/1974 | Franklin, Jr. | 62/430 X |
| 4,103,510 | 8/1978 | Hall | 62/430 X |

FOREIGN PATENT DOCUMENTS

57-144856 9/1982 Japan .
58-11370 1/1983 Japan .

Primary Examiner—William E. Wayner
Attorney, Agent, or Firm—Cushman, Darby & Cushman

[57] ABSTRACT

A refrigerator for a vehicle has a coldness accumulator formed by a container with water therein and an evaporator selectively connectable to a refrigeration cycle of an air conditioner of the vehicle. The coldness accumulator is disposed in a refrigeration space defined in a heat-insulating housing having an openable door mounted thereon. The water is cooled to freezing temperature during vehicle operation to accumulate coldness which is utilized to keep the refrigeration space at a low temperature when the evaporator is disconnected from the refrigeration cycle or when the refrigeration cycle is not operated.

12 Claims, 15 Drawing Figures

REFRIGERATOR FOR VEHICLE

FIELD OF THE INVENTION

The present invention relates to a refrigerator for vehicle which is equipped with an air conditioner including a refrigeration cycle to which the refrigerator is connectable to keep goods cold in a refrigeration space. More particularly, the invention is concerned with an automotive refrigerator which is operative to keep goods cold even when the automobile is parked.

DESCRIPTION OF THE PRIOR ART

An automotive refrigerator has been proposed which utilizes cooled air supplied by an air conditioner mountd on the automobile. Another type of the prior art automotive refrigerator is provided with an auxiliary refrigerant evaporator connected to a refrigeration cycle of an air conditioner mounted on the automobile.

The prior art automotive refrigerators, however, are operative to keep goods cold only when the automotive air conditioners are operated by the automotive engines by which the automobiles are driven. Thus, in the case where the automobile is parked under the blazing sun in a hot season, the temperature in the refrigeration space undesirably rises in a short period of time.

SUMMARY OF THE INVENTION

The present invention has its object to provide an automotive refrigerator which is operative to keep a refrigeration space at a low temperature for long time even if the automobile is parked under the blazing sun.

According to the present invention, the object is achieved by providing a coldness accumulator disposed in a refrigeration space. The coldness accumulator contains a heat or coldness storage medium which can be cooled by means of a refrigeration cycle of an automotive air conditioner to accumulate the heat or coldness of cooled refrigerant circulated through the refrigeration cycle during operation thereof and thus of the automotive engine. For this purpose, the refrigerator may preferably include an evaporator which is disposed in heat exchange relationship to the coldness storage medium in the coldness accumulator and is connectable through a valve to the refrigeration cycle of the air conditioner. The coldness storage medium may be any of the conventional heat storage materials, but may conveniently be water.

The above and other objects, features and advantages of the present invention will be made more apparent by the following description with reference to the accompanying drawings.

DESCRIPTION OF PREFERRED EMBODIMENTS

Figures 1, 1A:
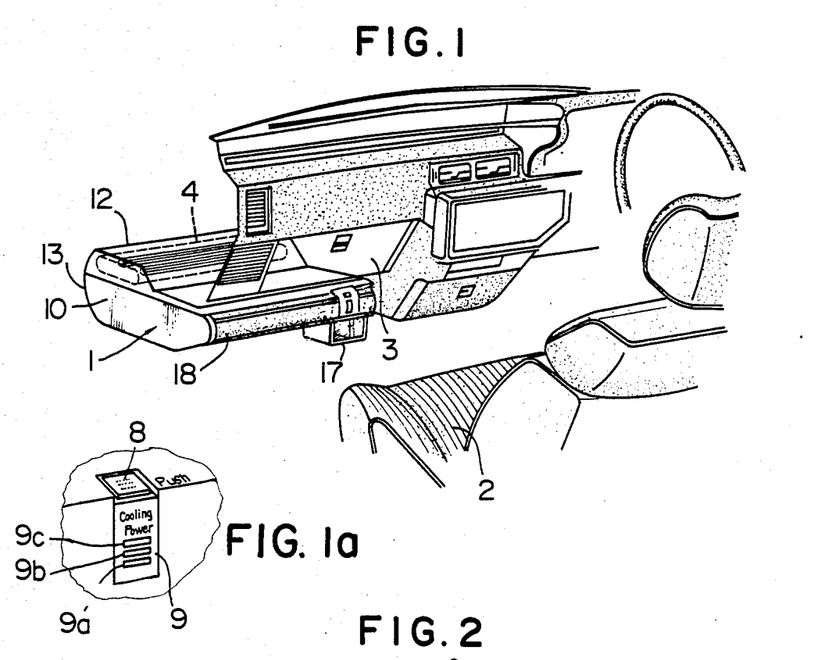
FIG. 1 is a fragmentary perspective view of the interior of an automobile equipped with an embodiment of the refrigerator according to the present invention.
FIG. 1a is an enlarged perspective view of a portion of FIG. 1.
Figure 2:
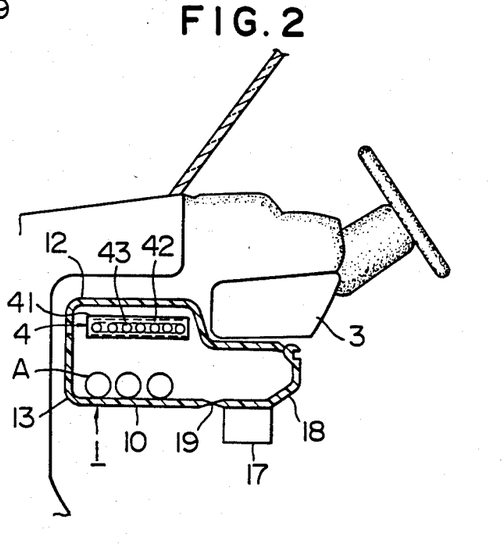
FIG. 2 is a sectional view of the automobile shown in FIG. 1 taken on a generally vertical plane extending through the refrigerator.

Referring first to FIGS. 1 and 2, an automotive refrigerator 1 is disposed in an inner part of a space under a glove box 3 forward of an assistant driver's seat 2 and is mounted on the automobile body by means of a bracket (not shown). A coldness storage or accumulator 4 is disposed in an upper part of a refrigeration space in the refrigerator 1 and has a generally horizontally elongated or flattened shape.

Figure 3:
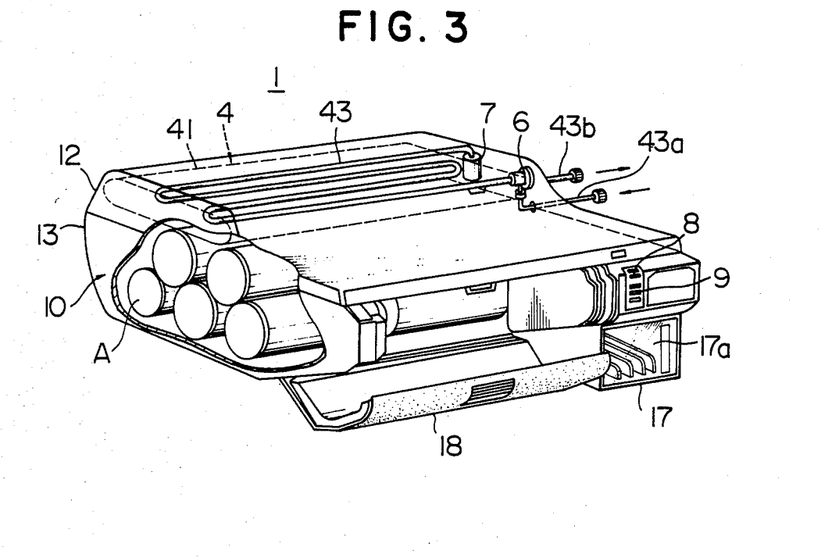
FIG. 3 is an enlarged, diagrammatic perspective view of the refrigerator with goods in a refrigeration space shown.
Figure 4:
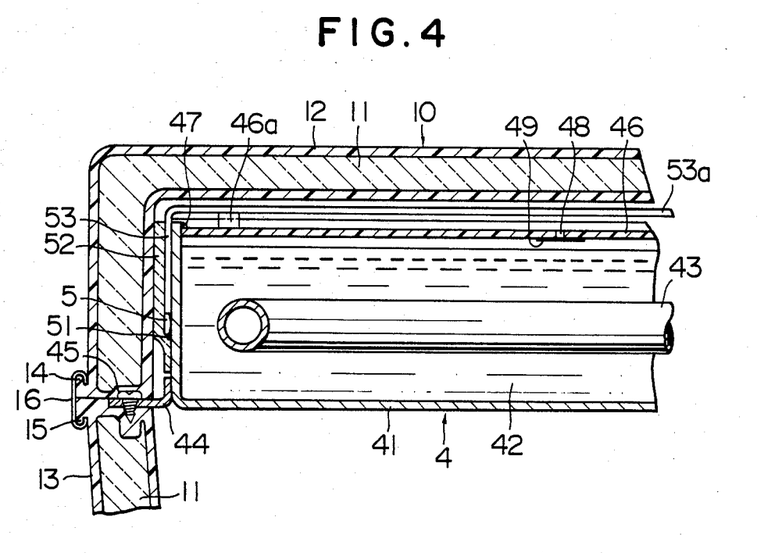
FIG. 4 is an enlarged, fragmentary sectional view of the refrigerator shown in FIG. 3.

As shown in FIGS. 3 and 4 in detail, the coldness accumulator 4 includes a generally flattened container 41 which is formed of metal (preferably aluminum) and contains a quantity of coldness storage medium 42 which is conveniently water. A refrigerant evaporator 43 is disposed in the container 41 in heat exchange relationship with the water 42. The evaporator 43 is preferably formed by a length of aluminum tube having a diameter of 12.7 mm. The refrigerator 1 has a heat insulating housing 10 of a double-walled structure which is blow-molded from a plastic material such as polypropylene. The space between the inner and outer walls of the housing 10 is filled with foamed urethane. The housing 10 consists of upper and lower parts 12 and 13 which have been separately fabricated to facilitate an easy mounting of the coldness accumulator 4 in the housing 10. A plurality of generally L-shaped brackets 44 (only one of which is shown) are secured by welding or soldering to the periphery of the aluminium container 41 and are secured to the upper edge face of the lower part 13 of the housing 10 by screws 45 (only one of which is shown) to secure the coldness accumulator 4 to the refrigerator housing 10. The lower and upper edge surfaces of the upper and lower housing parts 12 and 13 are abutted with each other and held together by clamps 16 (only one of which is shown) which engage bead flanges 14 and 15 provided along the outer peripheries of the edge surfaces of the housing parts 12 and 13.

The aluminium container 41 is closed by a lid 46 of a plastic material which is secured to the container after the coldness storage medium or water 42 and the evaporator 43 have been placed in the container. A plurality of L-shaped tabs 46a (see FIG. 5) are provided at spaced relationship along the periphery of the lid 46.

Figure 5:
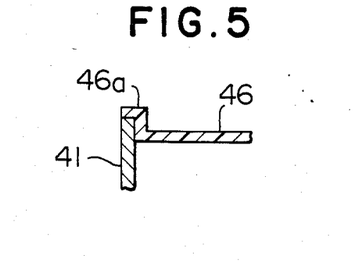
FIG. 5 shows, in enlarged, fragmentary section, a part of the section shown in FIG. 4.

The outer or free ends of the tabs 46a are engaged with the upper edge of the opening of the container 41, as shown in FIG. 5. Thereafter, a silicone-based sealing material 47 is applied to the gap between the container and the lid to form a seal.

A temperature sensor in the form of a thermistor 5 is mountd on the outer surface of the aluminium container 41 of the coldness accumulator 4 and attached thereto by means of a silicone-rubber 51 which functions not only to secure the thermistor 5 to the container 41 but also to eliminate any void or gap between the thermistor and the container to thereby assure a good transfer of heat from the container to the thermistor. The thermistor 5 is further covered with a heat insulating layer 52 formed by foamed urethane and placed between the container 41 and the refrigerator housing upper part 12. The thermistor 5 is connected with a conductor 53 which extends between the housing upper part 12 and the container 41 and has a portion 53a extending out of the refrigerator housing 10 at a point thereof where refrigerant inlet and outlet pipe lines 43a and 43b are connected to the evaporator 43, as will be seen in FIG. 3.

The container lid 46 is formed therein with a small air vent 48 which is closed by a breathing valve member 49 which is formed by a cloth-like element which in turn is formed from a hydrophobic material, such as polytetrafluorethylene available in the market in the name of Teflon (Trade Name). The breathing valve member 49, therefore, allows only the air to pass so that the interior of the container 41 can be kept at substantially constant pressure irrespective of variation in the volume of the water 42 in the container.

A constant pressure expansion valve 6 and a check valve 7 are provided at the refrigerant inlet side and outlet side of the refrigerator 43, as will be seen in FIG. 3.

The refrigerator 1 is provided with a manually operable refrigerator switch 8 and an indicator 9 for indicating the level of accumulation of coldness in the accumulator, i.e., the extent to which the water 42 is frozen. In the embodiment of the invention, the indicator 9 comprises three luminous diodes 9a, 9b and 9c which, however, may be replaced by three lamps (not shown). The switch 8 and the indicator 9 are disposed on the front face of the refrigerator housing 10 directed toward the assistant driver's seat 2.

A box 17 of a heat insulating structure formed by a plastic material is secured to the underside of the refrigerator housing 10 below the switch 8 and the indicator 9, as will be seen in FIGS. 1 and 3. The box 17 is adapted to accommodate an article which is adversely affected by a relatively high temperature, such as a cassette tape or eye-glasses with a plastic frame. The box 17 is normally closed by an openable lid 17a which is detachably or pivotally attached to a forward opening of the box.

The refrigerator housing 10 is provided with an opening normally closed by a lid or door 18 which is integrally connected by a thin hinge section or web 19 to the lower part 13 of the refrigerator housing 10, as will be best seen in FIG. 2. The door 18 is swingable or openable downwardly about the hinge web 19 to provide an access to the refrigeration space and thus to cooled goods A shown in FIGS. 2 and 3 as being disposed in the refrigeration space.

Figure 6:
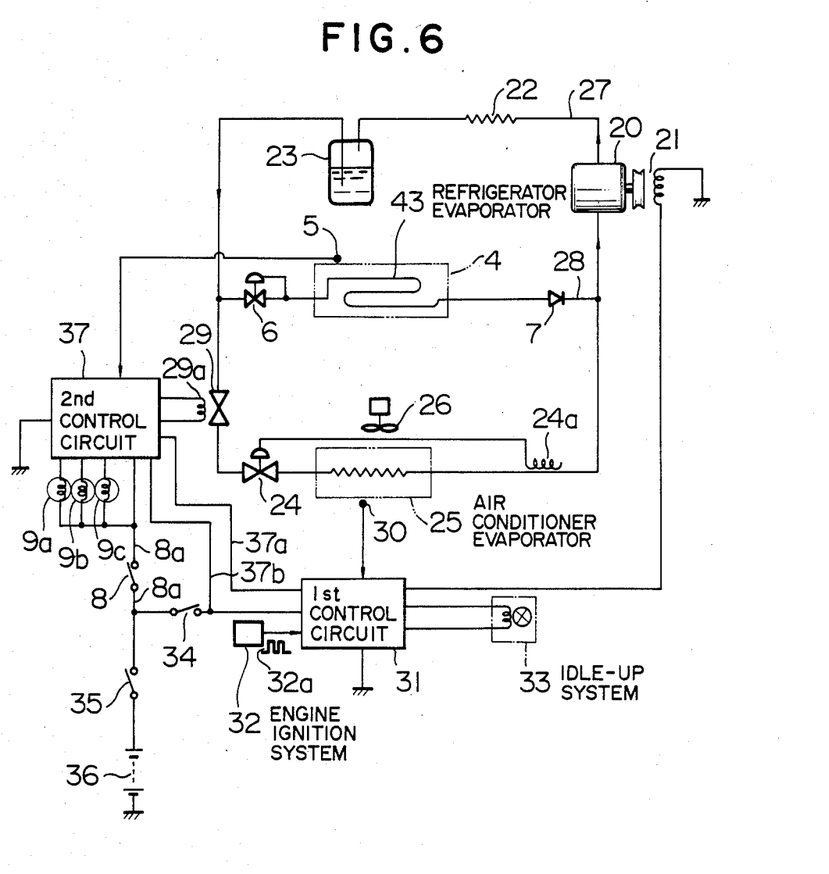
FIG. 6 is a block diagram showing an electric circuitry and a refrigeration cycle.

Referring to FIG. 6, the evaporator 43 of the refrigerator 1 is adapted to be operatively connected to a refrigeration cycle of an air conditioner mounted on the automobile on which the refrigerator 1 is mounted. The refrigeration cycle includes a refrigerant compressor 20 adapted to be drivinly connected to and disconnected from an engine (not shown) of the automobile by means of an electromagnetic clutch 21. The compressor 20 is driven by the engine to discharge refrigerant at a high temperature and at a high pressure. The discharged refrigerant flows through a refrigerant pipe line 27 to a condenser 22 by which the refrigerant is condensed. The condensed refrigerant then flows into a receiver 23 from which only liquid-phase refrigerant flows to a pressure-reduction means 24 by which the liquid refrigerant is expanded to a spray at a low temperature and a low pressure, which then flows into an evaporator 25 of the automotive air conditioner.

The pressure-reduction means 24 is in the form of a temperature responsive automatic expansion valve whose restriction is variable in response to a pressure signal from a temperature sensitive tube 24a disposed in close contacting relationship to an outlet pipe of the evaporator 25. Thus, the expansion valve 24 is operative to keep substantially constant the superheat of the refrigerant in the outlet pipe of the evaporator 25.

The air conditioner evaporator 25 is adapted to be associated or combined with an automotive heater unit (not shown) to be disposed, for example, in a space under a central section of an instrument panel of an associated automobile. A cooling fan 26 is operative to direct indoor or outdoor air to the evaporator 25 by which the air is cooled and then flows into the indoor space in the automobile through air outlets (not shown) provided at central, left and right portions of the instrument panel.

The compressor 20, the condenser 22, the receiver 23, the expansion valve 24 and the evaporator 25 are connected in series by the refrigerant pipe line 27 to form a closed circuit which completes a refrigeration cycle.

A refrigerator pipe line 28 is connected to the refrigeration cycle in bypassing relationship to the expansion valve 24 and the air conditioner evaporator 25. The constant pressure expansion valve 6, the refrigerator evaporator 43 and the check valve 7, which have been mentioned previously, are provided in the refrigerator pipe line 28 and disposed in the mentioned order as viewed in the direction of the flow of the refrigerant through the refrigerator pipe line 28.

The constant pressure expansion valve 6 is of the type that is opened when the pressure of the lower pressure side of the valve, i.e., the evaporation pressure in the evaporator 43, is lowered below a predetermined pressure level, so that the lower pressure side of the expansion valve 6 is kept substantially constant. In the illustrated embodiment of the invention, the refrigerant used is R-12 having an evaporation temperature of minus 20° C. Thus, the set pressure for the expansion valve 6 is 0.5 Kg/cm$^2$G.

The control valve 29 is disposed in the refrigerant pipe line 27 between the pressure-reduction means 24 and the junction of the refrigerator pipe line 28 to the refrigerant pipe line 27 to shut off the flow of the refrigerant to the pressure-reduction means 24 and thus to the air conditioner evaporator 25 and to cause the refrigerant to flow into and through the refrigerator pipe line 28. In the preferred embodiment of the invention, the control valve 29 is in the form of a solenoid-operated valve having two positions, i.e., an open position and a closed position. However, it will be apparent to those skilled in the art that the solenoid-operated valve 29 may alternatively be any other ON-OFF valve.

A temperature sensor in the form of a thermistor 30 is disposed to detect a temperature related to the cooling operation of the evaporator 25, such as the temperature of cooled air downstream of the evaporator 25 or the temperature of an evaporator fin. The thermistor 30 emits an electric signal representing a temperature detected. The signal is put into a first control circuit 31 which is operative to electrically energize and deenergize the electromagnetic clutch 21. The control circuit 31 also receives from an engine ignition system 32 another pulsated electric signal 32a of a frequency related to the engine speed (r.p.m.). The control circuit 31 is responsive to the two input signals to control electric supplies to the electromagnetic clutch 21 and to an engine idle-up system 33 which is well-known to those in the art as being a device for increasing the engine r.p.m. by, for example, increasing the degree of opening of a throttle valve of an automotive engine carburetor. The control circuit 31 is electrically connected through an air conditioner switch 34 and an engine ignition switch 35 to an electric power source, i.e., battery 36.

A second control circuit 37 is connected to the ignition switch 35 by a line 8a in which the aforementioned refrigerator switch 8 is disposed. The second control circuit 37 is responsive to a signal from the afore-mentioned temperature sensor 5 to control electric supplies to the three indicator elements or lamps 9a–9c and to a solenoid 29a which actuates the control valve 29. The second control circuit 37 is also electrically connected by lines 37a and 37b to the first control circuit 31 to emit thereto an electric signal for forcibly rendering the electromagnetic clutch 21 engaged irrespective of the signals from the temperature sensor 30 and from the engine ignition system 32, as will be described in more detail later.

Figures 7, 7A:
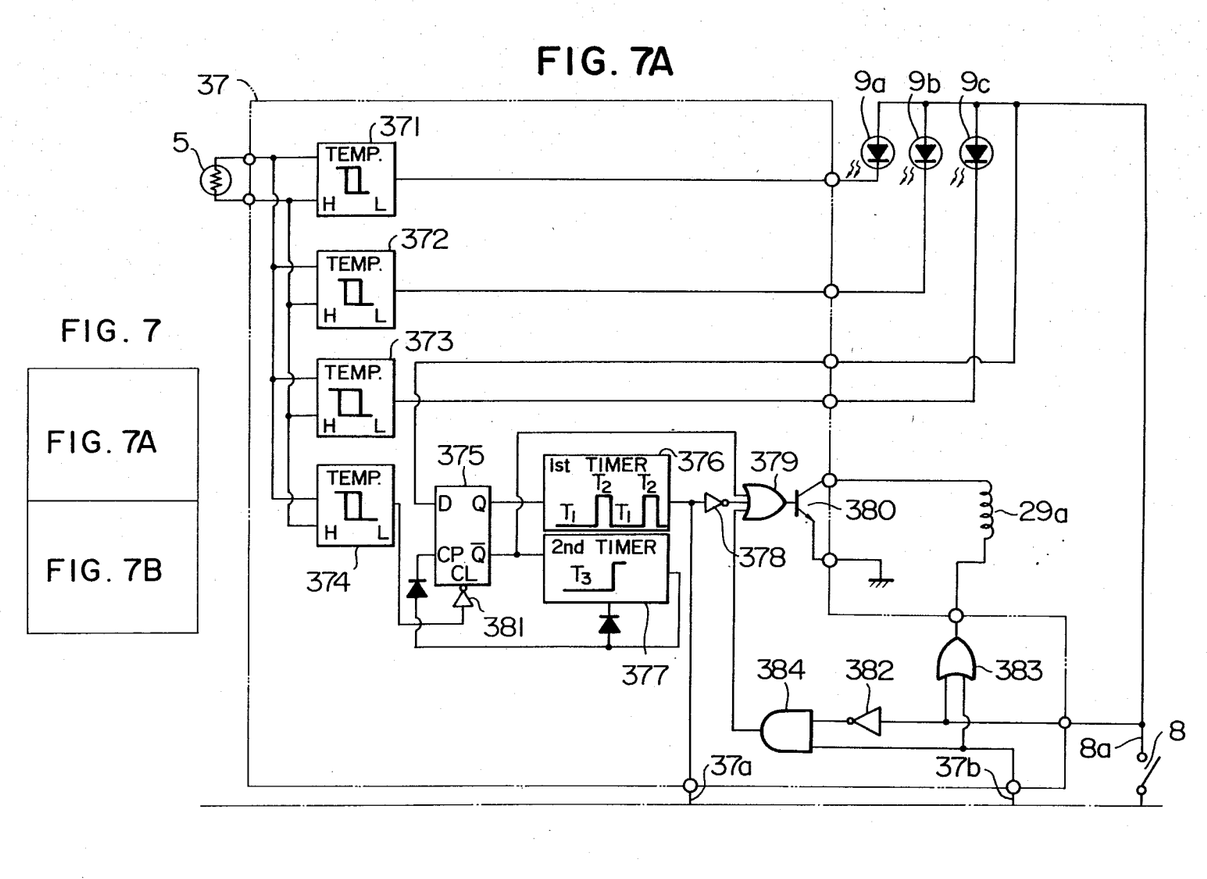
FIGS. 7A and 7B is a block diagram showing an example of the electric circuitry shown in FIG. 6.

The first and second control circuits 31 and 37 are shown in detail in FIG. 7. The first control circuit 31 shown in FIG. 7B includes a first comparator 310 operative to compare the temperature signal from the temperature sensor 30 with a reference signal to emit a comparator output signal, a frequency-voltage conversion circuit 311 operative to convert the pulsated electrical signal into a D.C. voltage, second and third comparators 312 and 313, first and second AND circuit gates 314 and 315, first and second transistors 316 and 317, a relay 318 and an invertor 319. These elements are electrically connected in the manner shown in FIG. 7B.

The second control circuit 37 shown in FIG. 7A includes first to third comparators 371, 372 and 373 having different reference potentials and operative to compare the temperature signal from the temperature sensor 5 with these reference potentials, respectively, a fourth comparator 374 having a hysteresis characteristic different from that of the third comparator 373, a D-flip-flop circuit 375, first and second timer circuits 376 and 377, invertors 378, 381 and 382, OR circuit gates 379 and 383, a transistor 380 and an AND circuit gate 384. All the elements are electrically connected in the manner shown in FIG. 7A.

Figure 7B:
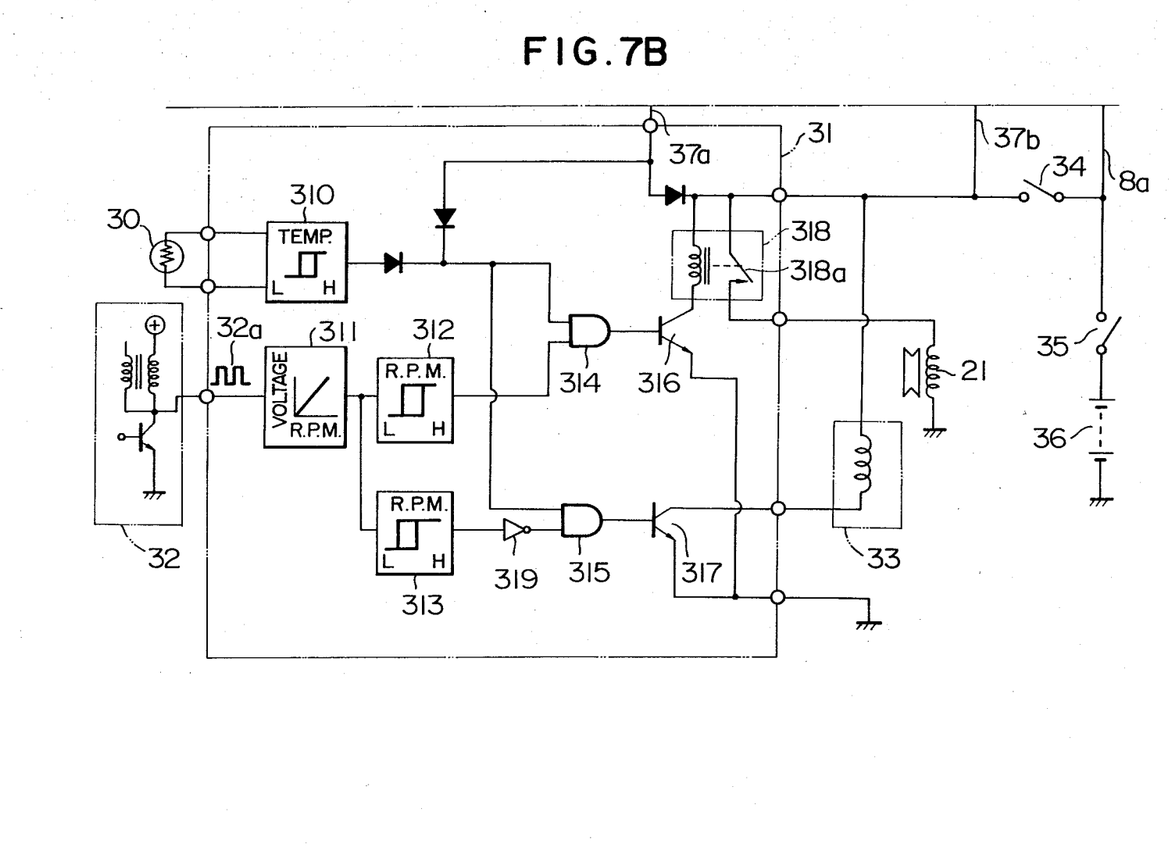

The first and second control circuits are electrically connected by the lines 37a and 37b, as shown in FIGS. 7A and 7B.

In operation, assuming that the automobile is being operated (and thus the engine ignition switch 35 is closed), if it is desired to cool the occupant compartment of the automobile, the air conditioner switch 34 will be turned on to supply the first control circuit 31 with electric power. In the initial stage of the air conditioning, because the temperature detected by the temperature sensor 30 is higher than a preset temperature (for example, 3° C.), the output of the comparator 310 is at a "High" level. In addition, because the engine r.p.m. is normally higher than a preset speed (for example, 750 r.p.m.), the output of the comparator 312 is at a "High" level. These comparator outputs are fed into the AND circuit gate 314 to cause the same to emit an output at a "High" level, so that the transistor 316 is rendered conductive to allow the relay 318 to be electrically energized, with a result that a relay contact 318a is closed to allow the current to flow to the electromagnetic clutch 21, whereby the clutch is engaged to drivingly connect the refrigerant compressor 20 with the automotive engine.

At this time, because the refrigerator switch 8 is open, the output of the AND circuit gate 384 of the second control circuit 37 is always at a "High" level. Thus, the output of the OR circuit 379 is at a "High" level to render the transistor 380 conductive. In addition, because the output of the OR circuit 383 is at a "High" level, the solenoid coil 29a of the control valve 29 is electrically energized to keep the valve 29 open.

For the above reasons, the refrigerant discharged from the compressor 20 is circulated through the refrigerant pipe line 27. The refrigerant is evaporated in the air conditioner evaporator 25 to absorb evaporation heat from the air around the evaporator 25. The cooled air is blown into the occupant compartment of the automobile. The evaporation pressure in the evaporator 25 is in the order of from 2 to 3 Kg/cm². Thus, the end of the refrigerator pipe line 28 adjacent to the suction side of the compressor 20 is subjected to a pressure approximately equal to the pressure of from 2 to 3 Kg/cm². Thus, the check valve 7 is kept closed and blocks the refrigerator pipe line 28 against intrusion of the refrigerant thereinto.

With the air conditioner operated as above, if it is required to operate the refrigerator 1, the refrigerator switch 8 will be turned on. Thus, the output of the AND circuit 384 of the second control circuit 37 now becomes "Low" level, so that the output of the OR circuit 379 becomes independent from the AND circuit 384. In addition, because the temperature of the coldness accumulator 4 as detected by the temperature sensor 5 is higher than the reference temperatures preset in all of the first to fourth comparators 371–374, these comparators emit outputs all at "High" levels. Accordingly, the indicator lamps 9a, 9b and 9c are all switched off, and, in addition, the outputs Q and $\overline{Q}$ of the D-flip-flop 375 are at "High" level and "Low" level, respectively. The "High" level output Q operates the first timer circuit 376 such that it continuously produces a pulsated output which is at a "Low" level during a time period $T_1$ (for example, 60 seconds) and at a "High" level during another time period $T_2$ (for example, 15 seconds). This pulsated output is fed through the invertor 378 and the OR circuit 379 into the transistor 380, so that this transistor is rendered conductive for the time period $T_1$ and then non-conductive for the time period $T_2$. This transistor operation is repeated to discontinuously energize the solenoid 29a of the control valve 29. The valve is opened when the solenoid 29a is electrically energized. Accordingly, the control valve 29 is opened during the time period $T_1$ and closed during the time period $T_2$. The valve opening and closing operations will be repeatd.

When the control valve 29 is closed, the flow of the refrigerant to the air conditioner evaporator 25 is interrupted with a resultant sudden pressure-drop at the intake or suction side of the compressure 20. The refrigerant pressure at the compressor intake side drops to about 0.5 Kg/cm$^2$ in quite a short period of time (for example, 3–4 seconds). Because of this compressor intake pressure drop, the expansion valve 6 is opened to allow the refrigerant to flow through the refrigerator pipe line 28. At this time, the expansion valve 6 keep its low pressure side at a controlled set level (0.5 Kg/cm$^2$), so that the operation of the refrigerator evaporator 43 is controlled such that the evaporation pressure therein is 0.5 Kg/cm$^2$ and the evaporation temperature is minus 20° C. Thus, the evaporator 43 cools the coldness storage medium (water) in the container 41.

When the time period $T_2$ has passed, the solenoid 29a is energized to open the control valve 29 so that the refrigerant is again allowed to flow to and through the air conditioner evaporator 25. The refrigerant pressure in the evaporator 25 and at the intake side of the compressor 20 again rises to about 2–3 Kg/cm$^2$. This refrigerant pressure is much higher than the pressure (0.5 Kg/cm$^2$) within the refrigerator evaporator 43 but, because the check valve 7 is provided in the refrigerator pipe line 28 downstream of the evaporator 43, the check valve 7 prevents the occurence of any pressure rise in the evaporator 43 which would otherwise be caused by a counter-flow of gasified refrigerant from the evaporator 25 into the evaporator 43. On the other hand, the constant expansion valve 6 automatically closes when the pressure at the low pressure side thereof is increased beyond the set level of 0.5 Kg/cm$^2$. During the time period $T_1$, therefore, the liquid refrigerant in the evaporator 43 is progressively evaporated to continue cooling of the coldness storage medium (water) around the evaporator 43.

The control valve 29 is repeatedly opened and closed during successive time periods $T_1$ and $T_2$ so that the coldness storage medium (water) in the container 41 in the coldness accumulator 4 is progressively cooled to its freezing temperature by the operation of the refrigerator evaporator 43.

During the time period $T_2$ (15 seconds) during which the refrigerant is permitted to flow to the refrigerator evaporator 43, the air conditioner evaporator 25 is not supplied with the refrigerant. During this time period, however, the heat capacity of the evaporator 25 keeps this evaporator at a low temperature thereby to prevent any abrupt and substantial temperature rise of the air flowing through and out of the evaporator 25. Thus, the variation in the temperature of the air flowing through and out of the air conditioner evaporator 25, which is caused by the repeated closing and opening of the control valve 29, is less than the air temperature variation which is caused by discontinuous or intermittent compressor operation which is controlled by the engagement and disengagement of the electromagnetic clutch 21.

Figure 8:
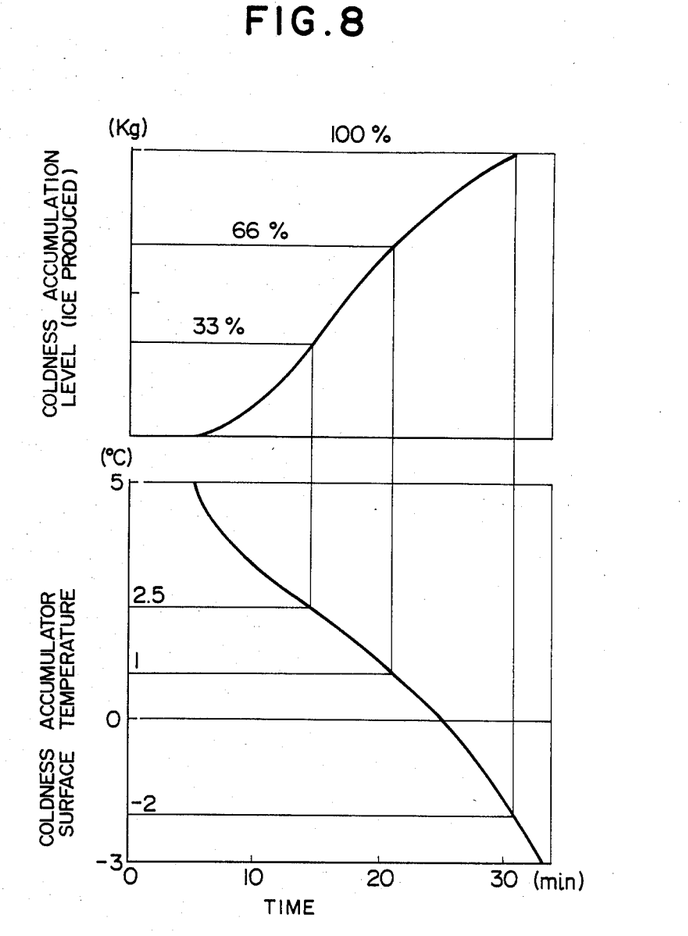
FIG. 8 is a graphical illustration of coldness accumulation level (production of ice) and coldness accumulator surface temperature relative to time.
Figure 9:
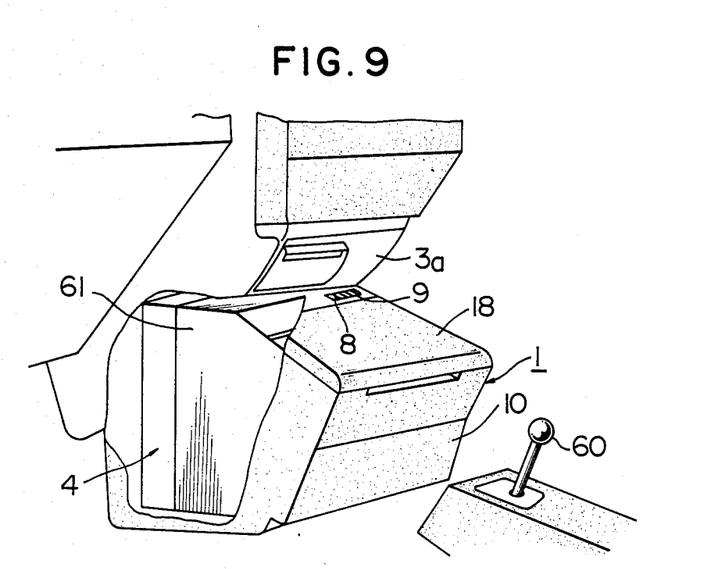
FIG. 9 is a fragmentary perspective view of the interior of an automobile equipped with another embodiment of the refrigerator according to the present invention.

It has been found by the inventors that, when the refrigerator 1 was operated in the above-described manner for 30 minutes, the water 42 was cooled to produce 1 Kg of ice, as will be seen in FIG. 8. It has also been verified through experimental tests that the temperature of the surface of the coldness accumulator container 41 is related to the level of accumulation of the coldness (amount of ice produced) as shown in FIG. 8. When the surface temperature of the container 41 is lowered to 2.5° C., the water 42 is frozen to produce about ⅓ of the 1 Kg of ice. When the container surface temperature is further lowered to 1° C., the water is frozen to produce about ⅔ of the 1 Kg of ice and, when the container surface temperature is further lowered to minus 2° C., the production of the 1 Kg of ice is completed.

The described relationship between the surface temperature of the container 41 and the level of the accumulation of coldness (amount of ice produced) in the coldness accumulator is utilized to inform the driver of the level of the coldness accumulation in the refrigerator 1. More specifically, when the temperature of the container 41 as detected by the temperature sensor 5 is lowered to 2.5° C., the output of the first comparator 371 of the second control circuit 37 is inverted from "High" level to "Low" level so that the indicator lamp 9a lightens. When the coldness accumulator container temperature is lowered to 1° C., the output of the second comparator 372 is inverted from "High" to "Low" level so that, in addition to the indicator lamp 9a, the indicator lamp 9b is also turned on. When the container temperature is further lowered to minus 2° C., the output of the third comparator 373 is also inverted from "High" to "Low" level, so that all the three indicator lamps 9a, 9b and 9c are now lightened. As such, the indicator 9 is operative to inform the vehicle driver of the level of accumulation (amount of ice produced) of coldness in the refrigerator 1. In the case where all the three indicator lamps 9a–9c are lightened, the refrigeration space in the refrigerator 1 can be kept below 10° even if the automobile is parked under blazing sun for all a summer day from the morning to the evening.

When the accumulation of coldness is completed and all the three indicator lamps 9a–9c are lightened, the output of the fourth comparator 374 is also inverted from "High" to "Low" level, so that the outputs Q and $\overline{Q}$ of the D-flip-flop 375 are now inverted to "Low" level and "High" level, respectively, with a result that the first timer circuit 376 is rendered inoperative and the output of this timer circuit is fixed at "Low" level, whereas the second timer circuit 377 starts its timing operation. Because the output $\overline{Q}$ is at "High" level, the OR circuit 379 continues emitting an output at "High" level which maintains the transistor 380 conductive, so that the solenoid 29a of the control valve 29 is kept energized to keep the valve 29 open. Thus, the refrigerant does not flow through the refrigerator pipe line 28. This state continues for a predetermined time period $T_3$, for example 5 minutes, set in the second timer circuit 377. During this time period $T_3$, therefore, the refrigerator evaporator 43 is not operated to accumulate coldness and, thus, the air conditioner performs its maximum cooling operation.

When the time period $T_3$ has passed, the output of the second timer cicuit 377 is inverted from "Low" to "High" level. Thus, the second timer circuit 377 is reset to its initial state and emits a clock pulse to the D-flip-flop 375. At this time, if the output of the fourth comparator 374 is still at "Low" level, the outputs Q and $\overline{Q}$ of the D-flip-flop 375 are kept at "Low" and "High" levels, respectively. Thus, the refrigerator evaporator 43 is kept inoperative for another time period $T_3$ set by the second timer circuit 377. However, at the moment when the clock pulse is emitted to the D-flip-flop 375, if the coldness accumulator container temperature detected by the temperature sensor 5 is raised beyond the range of the hysteresis of the fourth comparator 374 and thus the output thereof is turned to "High" level, the outputs Q and $\bar{Q}$ of the D-flip-flop 375 are inverted to "High" and "Low" levels, respectively. This will mean that the first timer circuit 376 resumes its operation, so that it emits the pulsated signal having time intervals of $T_1$ and $T_2$, whereby the control valve 29 is repeatedly opened and closed for the intermittent supply of the refrigerant to the refrigerator evaporator 43 and to the air conditioner evaporator 25 in the manner described hereinabove.

As will be seen from the above description, the second control circuit 37 is operative not only to control the operation of the indicator 9 for indicating the level of accumulation of coldness (amount of ice produced) but also to stop the coldness-accumulating operation of the refrigerator evaporator 4 when the coldness accumulation (production of ice) has been completed.

The second control circuit 37 is further operative to cooperate with the first control circuit 31 to control the electromagnetic clutch 21, as will be described in detail hereunder. When the occupant compartment has been cooled by the operation of the air conditioner evaporator 25 to a level at which the temperature detected by the temperature sensor 30 is lower than the level set by the comparator 310, the output of this comparator becomes "Low" level. Thus, the output of the AND circuit 314 also becomes "Low" level. Thus, the transistor 316 opens the contact 318a of the relay 318 to deenergize the electromagnetic clutch 20 whereby the compressor 20 is stopped to prevent the occurence of undesirable frost on the evaporator 25.

Even in the state where the compressor 20 is stopped for the purpose of preventing frost on the air conditioner evaporator 25, the first timer circuit 376 of the second control circuit 37 is operative to emit its output. When the first timer circuit output is at "High" level (during the time period $T_2$), this "High" level output is fed through the line 37a into the first control circuit 31 to render the transistor 316 conductive so that the relay contact 318a is forcibly closed to restart the compressor 20. It will be appreciated that the compressor 20 is restarted independently of the signal from the comparator 310 of the first control circuit 31. The control valve 29 is closed during the time period $T_2$ to block the flow of the refrigerant to the air conditioner evaporator 25. Thus, the restart of the compressor 20 during this time period $T_2$ by no means adversely affects the prevention of the frost on the evaporator 25 and, instead, is effective to operate the refrigerator evaporator 43 to cool the coldness storage medium (water) for the accumulation of coldness in the refrigerator 1.

Similarly, even when the air conditioner switch 34 is open, the first timer circuit 376 of the second control circuit 37 is operative to forcibly operate the compressor 20 for the coldness-accumulation in the refrigerator 1 during the time period $T_2$.

If the engine r.p.m. is lowered due to some reason below a predetermined speed (for example, 450 r.p.m.), the output of the comparator 312 becomes "Low" level, so that the relay contact 318a is opened to stop the compressor 20 for thereby preventing an engine stall.

The box 17 referred to previously is attached to the underside of the refrigerator housing 10 at a portion where the heat insulating material of the housing 10 is reduced or eliminated. Thus, the interior of the box 17 is cooled by the refrigerator 1 and can be kept at a temperature as low as less than 40° C. even when the occupant compartment of the automobile parked under the sun is heated to a temperature of approximately 80° C. Thus, the box 17 is effective to prevent thermal deformation and deterioration in quality of goods and articles in the box, such as cassette tapes, plastic frames of eye glasses, golf balls and cosmetics.

Another embodiment of the automotive refrigerator according to the present invention is shown in FIGS. 9-12, wherein the parts similar or equivalent to those of the first embodiment of the invention are designated by the same reference numerals. The refrigerator 1 is disposed in a space under a central part of the instrument panel 3a of an automobile and forward of a speed-change lever 60 thereof and is mounted on the body of the automobile by means of a bracket (not shown). The refrigerator 1 has a housing 10 of a plastic material, as in the first embodiment. The housing 10 is provided with a door 18 which cooperates with the housing 10 to define a refrigeration space and which is operable to provide an access to goods A, such as juice cans, refrigerated in the refrigerator 1.

The coldness accumulator 4 and a cooling plate 61 are disposed in the housing 10 in a manner to be described hereunder. In the illustrated embodiment of the invention, the coldness accumulator 4 is generally vertically elongated or flattened and disposed in the refrigeration space at a part remote inwardly from the door 18. The coldness storage medium container 41 of the coldness accumulator 4 is generally vertically elongated, as will be seen in FIGS. 10 and 11, and made of a cold-worked metal having a high heat conductivity, such as aluminum. The coldness storage medium 42 in the container is water, as in the first embodiment of the invention. The refrigerator evaporator 43 comprises a plurality of zigzag turns of aluminium tube disposed in the container 41 in heat exchange relationship with the water 42. The open top of the container 41 is closed by a plastic lid 46 which is secured to the top portion of the container 41 by means of a plurality of locking members 46a. The lid 46 is sealed to the container by means of a silicone-based sealing material. The lid 46 is formed with an opening through which refrigerant inlet and output pipes 43a and 43b of the evaporator 43 extend. The above-mentioned sealing material is also used to form a liquid-tight seal between the lid 46 and the refrigerant inlet and outlet pipes 43a and 43b.

Figure 12:
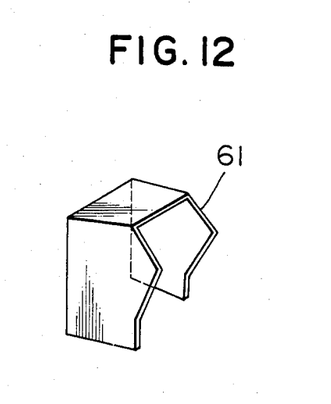
FIG. 12 is a perspective view of the cooling plate shown in FIG. 11.

The cooling plate 61 is generally U-shaped, as shown in FIG. 12, and formed of a sheet of a metal having a high heat conductivity, such as aluminium. The cooling plate 61 has an inverted U-shaped end face which is connected to one major outer surface of the container 41 by spot-welding so that the connection provides a good heat conductivity. The cooling plate 61 is shaped such that, when the assembly of the container 41 and the cooling plate 61 is placed in the refrigeration space in the housing 10, the cooling plate lines the top and opposite side walls of the housing 10.

Figure 10:
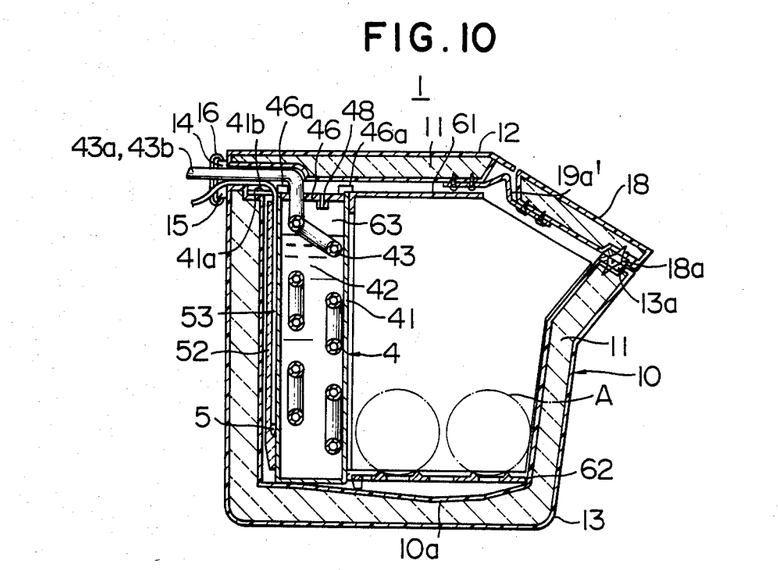
FIG. 10 is an enlarged, generally vertical sectional view of the refrigerator shown in FIG. 9.
Figure 11:
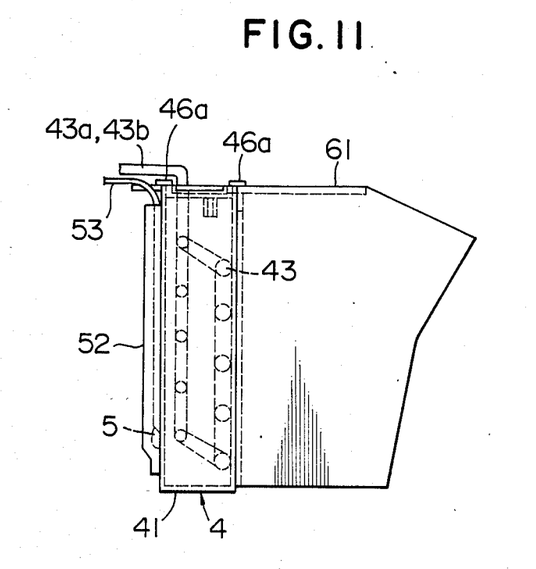
FIG. 11 is a side elevational view of a coldness accumulator and a cooling plate of the refrigerator shown in FIGS. 9 and 10.

The temperature sensor 5 is attached to the outer surface of the container 41, as in the first embodiment of the invention. The container 41 is secured to the refrigerator housing 10 by means of a mounting flange 41a which is fixed to the top edge surface of the lower part 13 of the housing 10 by means of screws (one of which is shown at 41b). The conductor 53 of the temperature sensor 5 extends upwardly between the heat insulating layer 52 and the container 41 and through an opening formed in the mounting flange 41a.

In the illustrated embodiment of the invention, the door 18 is pivotally connected to the upper part 12 of the refrigerator housing 10 by means of metallic hinges (one of which is shown at 19a'). A permanent magnet 18a is secured to the free end of the door 18, while plate 13a of a magnetic material such as iron is secured to the lower part 13 of the refrigerator housing 10 so that, when the door 18 is closed, the magnet 18a cooperates with the magnetic plate 13a to hold the door 18 in the closed position.

The bottom wall of the refrigerator housing 10 has a concave inner surface 10a above which a drainboard 62 is disposed to receive thereon goods A to be refrigerated. The concave inner bottom surface 10a of the housing may be formed with a draining port (not shown).

The vertically elongated shape of the container 41 can provide an air space 63 of a relatively larger vertical dimension between the upper level of the water 42 and the lid 46, so that the water 42 is prevented from jumping out of the container 41 through the air vent 48 formed in the lid 46. The illustrated embodiment, therefore, can eliminate the breathing valve member 49 employed in the first embodiment.

The coldness accumulator 4 disposed in the innermost portion of the refrigeration space in the housing is operative to cool the cooling plate 61 to a temperature substantially equal to the temperature of the accumulator 4. Thus, although the coldness accumulator 4 is not disposed at the upper part of the refrigeration space in the illustrated embodiment, the cooling plate 61 is operative to assure a substantially uniform temperature distribution in the refrigeration space. In addition, the U-shaped structure of the cooling plate 61 provides a useful access to the refrigerated goods A.

Figure 13:
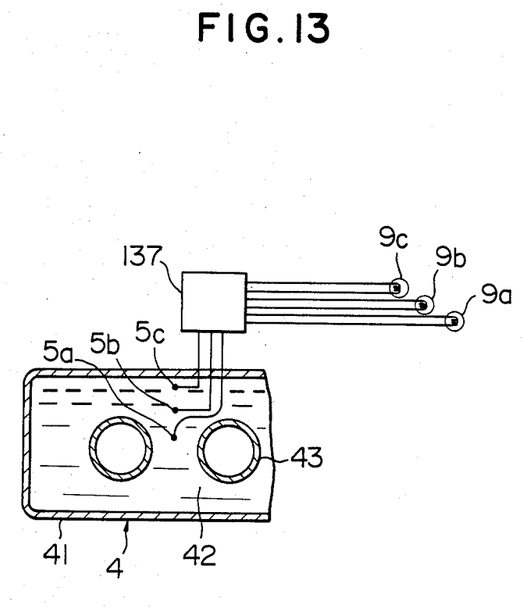
FIG. 13 is a partly diagrammatic and partly vertical sectional fragmentary view of a further embodiment of the refrigerator of the present invention.

FIG. 13 shows a further embodiment of the present invention, in which th coldness accumulator 4 has a generally horizontally elongated container 41 containing a coldness storage medium in the form of water 42 in which a refrigerant evaporator 43 is disposed in heat exchange relationship with the water 42. A plurality of thermistors 5a, 5b and 5c are disposed in the water 42 at progressively increasing distances from the evaporator 43 and are electrically connected through a control circuit 137 to indicator lamps 9a, 9b and 9c, respectively. The arrangement is such that the indicator lamps 9a–9c are lightened at the same temperature level of the water as detected by the thermistors 5a–5c. Because the water 42 is cooled to freezing temperature at a point nearest to the evaporator 43, the part of the water 42 at which the thermistor 5a is located is frozen first and, when this part of water is cooled to minus 2° C., the first indicator lamp 9a is energized. The frozen area of the water 42 is progressively expanded outwardly away from the evaporator 43 to the second thermistor 5b and, then, to the third thermistor 5c, whereby the second and third indicator lamps 9b and 9c are progressively lightened.

The control ciruit 137 is electrically connected to the control valve 29 (see FIG. 6) and is operative to keep the valve 29 open when the water temperature detected by the third thermistor 5c has been lowered to a level below minus 2° C. so that the refrigerant is allowed to flow to the air conditioner evaporator 25, but not to the refrigerator evaporator 43. When the water temperature detected by the third thermistor 5c rises to a level above 0° C., the control circuit 137 operates to periodically open and close the control valve so that the refrigerator evaporator 43 is fed with the refrigerant to accumulate the coldness in the coldness accumulator 4. The control circuit 137 is of a structure similar to that of the control circuit 37 described with reference to FIG. 7 and, thus, will not be described in detail herein.

The invention is not limited to the described embodiments and can have various changes and modifications, examples of which are:

(1) The position of the refrigerator 1 is not limited to the space adjacent to the instrument panel of the automobile and may be any other point where the refrigerant pipe line can be connected to an associated air conditioner pipe line, such as a baggage space or so-called "trunk room";

(2) The coldness storage medium container 41 may alternatively be formed of a stainless steel; the evaporator 43 may be formed by a flat tube rather than by the circular tube employed in the described embodiments; the coldness storage medium 42 is not limited to water and may be a water solution of an appropriate material which lowers the freezing point of water or, further alternatively, may be a material having gel and sol phases;

(3) The control circuits 31 and 37 may be integrated into a unitary control system which utilizes a microcomputer;

(4) The control valve 29 may alternatively be controlled on the basis of a detection of the temperature level of the refrigerator evaporator 43 rather than by the described timer circuits and may further alternatively be controlled by a manually operable switch so that the valve 29 can be closed or open for a prolonged time;

(5) The position of the control valve 29 is not limited to the point shown and may be at any other point on the part of the air conditioner pipe line 27 which is parallel to the refrigerator pipe line 28;

(6) The constant pressure expansion valve 6 shown in FIG. 6 may be replaced by a combination of a pressure reduction means (fixed restriction means such as a capillary tube or orifice) and a solenoid valve which is closed when the control valve 29 is opened; in such a case, the solenoid valve and the control valve 29 may be replaced by a single solenoid-operated three-way valve; and (7) Instead of periodically opening and closing the control valve 29 to feed the refrigerant into and through the refrigerator evaporator 43, the compressor 20 may be of a multiple cylinder type in which a selected number of cylinders have an independent suction or intake port conneced to the refrigerant pipe line 28 downstream of the check valve 7, whereby the control valve 29 can be eliminated and the air conditioner evaporator 25 and the refrigerator evaporator 43 can both be continuously supplied with the refrigerant so that the refrigerant evaporator 43 can be cooled to a temperature low enough to produce ice.

What is claimed is:

1. A refrigerator for a vehicle having an air-conditioner including a refrigeration cycle with a refrigerant to be circulated therein, said refrigerator comprising:
   a housing having a heat insulating structure;
   a door openably mounted on said housing and cooperating therewith to define a refrigeration space;
   a coldness accumulator disposed in said refrigeration space;
   said refrigeration cycle including a first evaporator;
   said coldness accumulator comprising a coldness storage medium, a second evaporator disposed in said refrigeration space and means supporting said coldness storage medium in heat exchange relationship to said second evaporator;
said second evaporator being adapted to be operatively connected to said refrigeration cycle;
means for detecting a level of accumulation of coldness in said coldness accumulator and emitting a signal representing a coldness accumulation level thus detected;
indicator means responsive to said signal to indicate the coldness accumulation level detected by said detecting means;
said refrigeration cycle further including a first refrigerant expansion means adjacent to an inlet of said first evaporator;
a second refrigerant expansion means adjacent to an inlet of said second evaporator;
an electrically operable valve means operative to selectively cause the refrigerant to flow from said refrigeration cycle to and through said second refrigerant expansion means and thus said second evaporator;
means comparing said signal with a reference signal and emitting a comparator output signal when the level of the coldness accumulation in said accumulator reaches a predetermined set level; and
electric actuator means responsive to said comparator output signal to actuate said valve means so that the flow of the refrigerant to said second evaporator from said refrigeration cycle is stopped.

2. A refrigerator according to claim 1, further including a box attached to the underside of said housing and adapted to store an article at a low temperature.

3. A refrigerator according to claim 1, wherein said supporting means comprises a container which has a generally horizontally elongated shape and is dispoed in an upper part of said refrigeration space in said housing.

4. A refrigerator according to claim 1, wherein said supporting means comprises a container which has a generally vertically elongated shape and is disposed in a part of said refrigeration space remote from said door.

5. A refrigerator according to claim 1, wherein said supporting means comprises a container wherein said coldness storage medium is a liquid which solidifies at a first predetermined temperature, wherein said detecting means comprise a plurality of temperature sensors disposed in said coldness storage medium in said container at progressively increasing different distances from said second evaporator and each of said temperature sensors emits an electrical signal when said coldness storage medium is cooled substantially to a second predetermined temperature not higher than said first predetermined temperature, and wherein said indicator means comprise a plurality of electrical indicating elements associated with said temperature sensors and adapted to be electrically energized in accordance with electrical signals emitted by said temperature sensors, respectively.

6. A refrigerator for a vehicle having an air-conditioner including a refrigeration cycle with a refrigerant to be circulated therein and having a first evaporator, said refrigerator comprising:
a housing having a heat insulating structure;
a door openably mounted on said housing and cooperating therewith to define a refrigeration space;
a coldness accumulator disposed in said refrigeration space and containing a coldness storage medium adapted to be cooled by said refrigeration cycle to accumulate coldness in said accumulator, said accumulator comprising a container for said coldness storage medium and a second evaporator disposed in said container in heat exchange relationship to said coldness storage medium, said second evaporator being adapted to be operatively connected to said refrigeration cycle;
means for detecting a level of accumulation of coldness in said coldness accumulator and emitting a signal representing a coldness accumulation level thus detected;
indicator means responsive to said signal to indicate the coldness accumulation level detected by said detecting means;
valve means operable to selectively permit the refrigerant to flow to and through said second evaporator from said refrigeration cycle;
means comparing said signal with a reference signal and emitting a comparator output signal when the level of the coldness accumulation in said accumulator reaches a predetermined set level; and
actuator means responsive to said comparator output signal to actuate said valve means so that the flow of the refrigerant to said second evaporator from said refrigeration cycle is stopped, said actuator means including timer means operative to assure that, after the lapse of a predetermined time period from the moment when the flow of the refrigerant to said second evaporator is stopped, the refrigerant is again allowed to flow to said second evaporator.

7. A refrigerator for a vehicle having an air-conditioner including a refrigeration cycle with a refrigerant to be circulated therein and having a first evaporator, said refrigerator comprising:
a housing having a heat insulating structure;
a door openably mounted on said housing and cooperating therewith to define a refrigeration space;
a coldness accumulator disposed in said refrigeration space and containing a coldness storage medium adapted to be cooled by said refrigeration cycle to accumulate coldness in said accumulator, said accumulator comprising a container for said coldness storage medium and a second evaporator disposed in said container in heat exchange relationship to said coldness storage medium, said second evaporator being adapted to be operatively connected to said refrigeration cycle;
means for detecting a level of accumulation of coldness in said coldness accumulator and emitting a signal representing a coldness accumulation level thus detected;
indicator means responsive to said signal to indicate the coldness accumulation level detected by said detecting means;
an electrically operable valve means operable to selectively cause the refrigerant to flow to and through said second evaporator from said refrigeration cycle;
means comparing said signal with at least two reference signals of different levels and emitting a first comparator output signal when the level of the coldness accumulation in said accumulator reaches a first predetermined set level, said comparing means further emitting a second comparator output signal when the coldness accumulation level in said accumulator reaches a second predetermined set level greater than said first set level; and electrical actuator means responsive to said first and second comparator output signals to electrically actuate said valve means, said actuator means including a first timer circuit responsive to said first comparator output signal to electrically actuate said valve means at predetermined time intervals so that said second evaporator intermittently receives the refrigerant from said refrigeration cycle, said actuator means further including a second timer circuit responsive to said second comparator output signal to electrically actuate said valve means so that the flow of the refrigerant to said second evaporator from said refrigeration cycle is interrupted for a predetermined time period and the refrigerant is again allowed to flow to said second evaporator from said refrigeration cycle after the lapse of said predetermined time period.

8. A refrigerator for a vehicle having an air-conditioner including a refrigeration cycle with a refrigerant to be circulated therein and having a first evaporator, said refrigerator comprising:

a housing having a heat insulating structure;

a door openably mounted on said housing and cooperating therewith to define a refrigeration space;

a coldness accumulator disposed in said refrigeration space and containing a coldness storage medium adapted to be cooled by said refrigeration cycle to accumulate coldness in said accumulator, said accumulator comprising a container for said coldness storage medium and a second evaporator disposed in said container in heat exchange relationship to said coldness storage medium, said second evaporator being adapted to be operatively connected to said refrigeration cycle;

means for detecting a level of accumulation of coldness in said coldness accumulator and emitting a signal representing a coldness accumulation level thus detected;

indicator means responsive to said signal to indicate the coldness accumulation level detected by said detecting means;

valve means operable to selectively permit the refrigerant to flow to and through said second evaporator from said refrigeration cycle;

means comparing said signal with a reference signal and emitting a comparator output signal when the level of the coldness accumulation in said accumulator reaches a predetermined set level; and actuator means responsive to said comparator output signal to actuate said valve means so that the flow of the refrigerant to said second evaporator from said refrigeration cycle is stopped;

said air conditioner further including a refrigerant compressor;

an electromagnetic clutch for drivingly connecting and disconnecting said compressor to and from an engine of the vehicle; and means for controlling the operation of said electromagnetic clutch, said controlling means including means responsive to at least a condition related to the operation of said first evaporator to emit an electrical signal and means responsive to said electrical signal to control the operation of said electromagnetic clutch, and wherein said actuator means include an electric circuit means operatively connected to said electrical signal responsive means to control said electromagnetic clutch independently of said electrical signal.

9. A refrigerator for a vehicle having an air-conditioner including a refrigeration cycle with a refrigerant to be circulated therein and having a first evaporator, said refrigerator comprising:

a housing having a heat insulating structure;

a door openably mounted on said housing and cooperating therewith to define a refrigeration space;

a coldness accumulator disposed in said refrigeration space and containing a coldness storage medium adapted to be cooled by said refrigeration cycle to accumulate coldness in said accumulator, said accumulator comprising a container for said coldness storage medium and a second evaporator disposed in said container in heat exchange relationship to said coldness storage medium, said second evaporator being adapted to be operatively connected to said refrigeration cycle;

means for detecting a level of accumulation of coldness in said coldness accumulator and emitting a signal representing a coldness accumulation level thus detected;

indicator means responsive to said signal to indicate the coldness accumulation level detected by said detecting means;

said detecting means comprising a single temperature sensor operative to detect the temperature of an outer surface of said container and said indicator means including a plurality of electrical indicating elements operatively associated with said temperature sensor and adapted to be electrically energized at different temperature levels detected by said temperature sensor.

10. A refrigerator for a vehicle having an air-conditioner including a refrigeration cycle with a refrigerant to be circulated therein, said refrigerator comprising:

a housing having a heat insulating structure;

a door openably mounted on said housing and cooperating therewith to define a refrigeration space;

a coldness accumulator disposed in said refrigeration space;

said refrigeration cycle including a first evaporator;

said coldness accumulator comprising a coldness storage medium, a second evaporator disposed in said refrigeration space and means supporting said coldness storage medium in heat exchange relationship to said second evaporator;

said second evaporator being adapted to be operatively connected to said refrigeration cycle;

means for detecting a level of accumulation of coldness in said coldness accumulator and emitting a signal representing a coldness accumulation level thus detected;

indicator means responsive to said signal to indicate the coldness accumulation level detected by said detecting means;

valve means operable to selectively permit the refrigerant to flow to and through said second evaporator from said refrigeration cycle;

means comparing said signal with a reference signal and emitting a comparator output signal when the level of the coldness accumulation in said accumulator reaches a predetermined set level; and actuator means responsive to said comparator output signal to actuate said valve means so that the flow of the refrigerant to said second evaporator from said refrigeration cycle is stopped;

said actuator means including timer means operative to assure that, after the lapse of a predetermined time period from the moment when the flow of the refrigerant to said second evaporator is stopped, the refrigerant is again allowed to flow to said second evaporator.

11. A refrigerator for a vehicle having an air-conditioner including a refrigeration cycle with a refrigerant to be circulated therein, said refrigerator comprising:

a housing having a heat insulating structure;

a door openably mounted on said housing and cooperating therewith to define a refrigeration space;

a coldness accumulator disposed in said refrigeration space;

said refrigeration cycle including a first evaporator;

said coldness accumulator comprising a coldness storage medium, a second evaporator disposed in said refrigeration space and means supporting said coldness storage medium in heat exchange relationship to said second evaporator;

said second evaporator being adapted to be operatively connected to said refrigeration cycle;

means for detecting a level of accumulation of coldness in said coldness accumulator and emitting a signal representing a coldness accumulation level thus detected;

indicator means responsive to said signal to indicate the coldness accumulation level detected by said detecting means;

valve means operable to selectively permit the refrigerant to flow to and through said second evaporator from said refrigeration cycle;

means comparing said signal with a reference signal and emitting a comparator output signal when the level of the coldness accumulation in said accumulator reaches a predetermined set level; and actuator means responsive to said comparator output signal to actuate said valve means so that the flow of the refrigerant to said second evaporator from said refrigeration cycle is stopped, said air conditioner further including a refrigerant compressor, an electromagnetic clutch for drivingly connecting and disconnecting said compressor to and from an engine of the vehicle and means for controlling the operation of said electromagnetic clutch, said controlling means including means responsive to at least a condition related to the operation of said first evaporator to emit an electrical signal and means responsive to said electrical signal to control the operation of said electromagnetic clutch;

said actuator means including an electric circuit means operatively connected to said electrical signal responsive means to control said electromagnetic clutch independently of said electrical signal.

12. A refrigerator for a vehicle having an air-conditioner including a refrigeration cycle with a refrigerant to be circulated therein, said refrigerator comprising:

a housing having a heat insulating structure;

a door openably mounted on said housing and cooperating therewith to define a refrigeration space;

a coldness accumulator disposed in said refrigeration space;

said refrigeration cycle including a first evaporator;

said coldness accumulator comprising a coldness storage medium, a second evaporator disposed in said refrigeration space and means supporting said coldness storage medium in heat exchange relationship to said second evaporator;

said second evaporator being adapted to be operatively connected to said refrigeration cycle;

means for detecting a level of accumulation of coldness in said coldness accumulator and emitting a signal representing a coldness accumulation level thus detected; and indicator means responsive to said signal to indicate the coldness accumulation level detected by said detecting means;

said detecting means comprising a single temperature sensor operative to detect the temperature of an outer surface of said coldness accumulator;

said indicator means including a plurality of electrical indicating elements operatively associated with said temperature sensor and adapted to be electrically energized at different temperature levels detected by said temperature sensor.

* * * * *